(12) United States Patent
Coats et al.

(10) Patent No.: US 11,905,125 B1
(45) Date of Patent: Feb. 20, 2024

(54) PARCEL CART LOADING SYSTEM

(71) Applicant: Material Handling Systems, Inc., Mt. Washington, KY (US)

(72) Inventors: Brandon Wayne Coats, Jeffersonville, IN (US); Jon Todd Fuchs, Louisville, KY (US); Errin Whitney Gnadinger, Louisville, KY (US); Thomas Anthony Hillerich, Jr., Louisville, KY (US); Nicholas Anderson Moore, Liberty Township, OH (US); Madhav Devidas Patil, Louisville, KY (US); Jonathan Dean Terrell, Louisville, KY (US); Joshua Alan Wiley, Georgetown, IN (US)

(73) Assignee: Material Handling Systems, Inc., Mt. Washington, KY (US)

( * ) Notice: Subject to any disclaimer, the term of this patent is extended or adjusted under 35 U.S.C. 154(b) by 588 days.

(21) Appl. No.: 17/213,554

(22) Filed: Mar. 26, 2021

Related U.S. Application Data

(60) Provisional application No. 62/994,941, filed on Mar. 26, 2020.

(51) Int. Cl.
*B65G 47/49* (2006.01)
*B65G 47/71* (2006.01)
*B65G 67/04* (2006.01)

(52) U.S. Cl.
CPC ........... *B65G 47/493* (2013.01); *B65G 47/71* (2013.01); *B65G 67/04* (2013.01); *B65G 2203/0216* (2013.01); *B65G 2203/041* (2013.01)

(58) Field of Classification Search
CPC ...... B65G 47/493; B65G 47/71; B65G 67/04; B65G 2203/0216; B65G 2203/041
See application file for complete search history.

(56) References Cited

U.S. PATENT DOCUMENTS

| | | | |
|---|---|---|---|
| 9,009,072 B2* | 4/2015 | Mountz | G06Q 10/08 705/28 |
| 10,048,697 B1* | 8/2018 | Theobald | G05D 1/0088 |
| 11,027,922 B1* | 6/2021 | Kayal | B65G 47/44 |
| 2012/0314059 A1* | 12/2012 | Hoffmann | G06T 7/0004 348/135 |
| 2015/0217334 A1* | 8/2015 | Kim | B07C 3/08 209/552 |
| 2016/0132220 A1* | 5/2016 | Chiu | G06F 3/04847 715/772 |

(Continued)

*Primary Examiner* — Kyle O Logan
(74) *Attorney, Agent, or Firm* — Stites & Harbison, PLLC; David W. Nagle, Jr.; Gary N. Stewart

(57) ABSTRACT

A parcel cart loading system includes: a conveyor; parcel carts for receiving parcels offloaded from the conveyor; a loading station where parcels are offloaded to the parcel carts; and a vision and control subsystem that is operably connected to a plurality of mobile robots. The vision and control subsystem acquires one or more images of parcel carts within a loading area of the loading station and determines if any of the parcel carts are fully loaded based on the image data. Each parcel cart determined to be fully loaded is autonomously transported out of the loading area and to its intended destination by one of the mobile robots within the system. Each parcel cart transported out of the loading area is replaced by another parcel cart from a queue area of the loading station by another mobile robot of the system.

14 Claims, 4 Drawing Sheets

(56) References Cited

U.S. PATENT DOCUMENTS

| | | | | |
|---|---|---|---|---|
| 2016/0167888 A1* | 6/2016 | Messina | ............... | B65G 37/00 |
| | | | | 198/315 |
| 2016/0185533 A1* | 6/2016 | Lykkegaard | ........... | B65G 47/52 |
| | | | | 198/890.1 |
| 2018/0155059 A1* | 6/2018 | Thogersen | ........... | B65G 1/1375 |
| 2019/0135551 A1* | 5/2019 | Sekich | ................ | B65G 43/00 |
| 2020/0276998 A1 | 9/2020 | Coats et al. | | |
| 2020/0283229 A1* | 9/2020 | Edwards | ............. | B65G 1/1373 |
| 2020/0317448 A1* | 10/2020 | Paterson, Jr. | ........ | B65G 1/1375 |

\* cited by examiner

PARCEL CART LOADING SYSTEM

CROSS-REFERENCE TO RELATED APPLICATIONS

The present application claims priority to U.S. Patent Application Ser. No. 62/994,941 filed on Mar. 26, 2020, the entire disclosure of which is incorporated herein by reference.

BACKGROUND OF THE INVENTION

The present invention relates to a parcel cart loading system.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility. Although many of the sorting systems are substantially automated, certain parcels, because of their size, weight or other complexities, require some manual sorting and handling. Such parcels are commonly manually pre-sorted and placed on carts assigned to a designated location. Once the cart is loaded, it is manually pushed or is hauled on a vehicle driven by an individual to the designated location and manually unloaded. Manual transport of such carts can pose a safety hazard to the individual responsible for transporting and unloading the cart. In instances where a vehicle is used to haul the parcels, it is common to wait for multiple carts intended for the outbound location to be fully loaded prior to transport in order to minimize the number of trips and distance traveled by the individual operating the vehicle. The process of waiting for multiple carts to be loaded can, however, introduce unnecessary downtime with respect to the sorting of such parcels and decrease the overall efficiency of the sorting facility.

Accordingly, there remains a need for improved systems for sorting and handling such parcels.

SUMMARY OF THE INVENTION

The present invention is a parcel cart loading system.

An exemplary system made in accordance with the present invention includes: a conveyor for transporting parcels within a sorting facility; a plurality of parcel carts configured to receive parcels offloaded from the conveyor; a loading station where parcels on the conveyor are transferred to the parcel carts within the system; and a vision and control subsystem that is operably connected to a plurality of mobile robots, such that the vision and control subsystem can communicate instructions to, and receive data from, each of the mobile robots.

The vision and control subsystem includes a camera for acquiring one or more images of a subset of parcel carts, and any parcels loaded therein, within the loading station that are positioned to receive parcels being offloaded from the conveyor. In some embodiments, the loading station can be characterized as including two separate areas: a loading area and a queue area. The loading area is the area within the loading station at which respective parcel carts of the system can be positioned to receive parcels being offloaded from the conveyor, and which is within the field of view of the camera. The queue area is the area of the loading station which receives parcel carts intended for subsequent transfer to the loading area. The image (or images) captured by the camera are processed within the vision and control subsystem to determine whether one or more parcel carts within the loading area are loaded in a manner that satisfies one or more predetermined conditions corresponding to a parcel cart being fully loaded (or "full"). In response to determining that a parcel cart within the loading area is full, the vision and control subsystem communicates transport instructions to one of the mobile robots (or a "first mobile robot") within the system to transport the full parcel cart to its predetermined destination within the sorting facility. In this regard, parcel carts within the loading area are thus immediately and autonomously dispatched to their predetermined destination once identified by the vision and control subsystem as being fully loaded. In this way, the system thus eliminates any downtime associated with waiting for multiple parcel carts intended for the same destination to be fully loaded before transport and the safety hazards associated with manually transporting loaded parcel carts.

Subsequent to the vision and control subsystem communicating instructions to transport a full parcel cart out of the loading area, the vision control subsystem communicates transport instructions to another mobile robot (or a "second mobile robot") within the system to transport a parcel cart positioned within the queue area to the location in the loading area at which the fully loaded parcel cart was previously positioned prior to transport. In this regard, the loading area of the loading station may include multiple predetermined locations at which parcel carts within the system can be positioned to receive parcels being offloaded from the conveyor.

In some embodiments, the vision and control subsystem may further communicate transport instructions to an additional mobile robot (or a "third mobile robot") within the system to transport a parcel cart positioned outside of the loading area and the queue area into the queue area to replace the parcel cart transported to the loading area, which replaced the fully loaded parcel cart. By replenishing the loading area and the queue area of the loading station with parcel carts in the above-described manner, the system helps to ensure a parcel cart is always available to receive a parcel upon reaching the loading area, thereby reducing downtime and improving overall efficiency within the sorting facility.

In some embodiments, the vision and control subsystem further includes a sensor and a display, which aid in determining which area of the sorting facility parcels loaded on the conveyor should be transported and indicating which parcel cart (or parcel carts) within the loading area a parcel can be properly loaded, respectively.

DETAILED DESCRIPTION OF THE INVENTION

The present invention relates to a parcel cart loading system.

Figure 1:
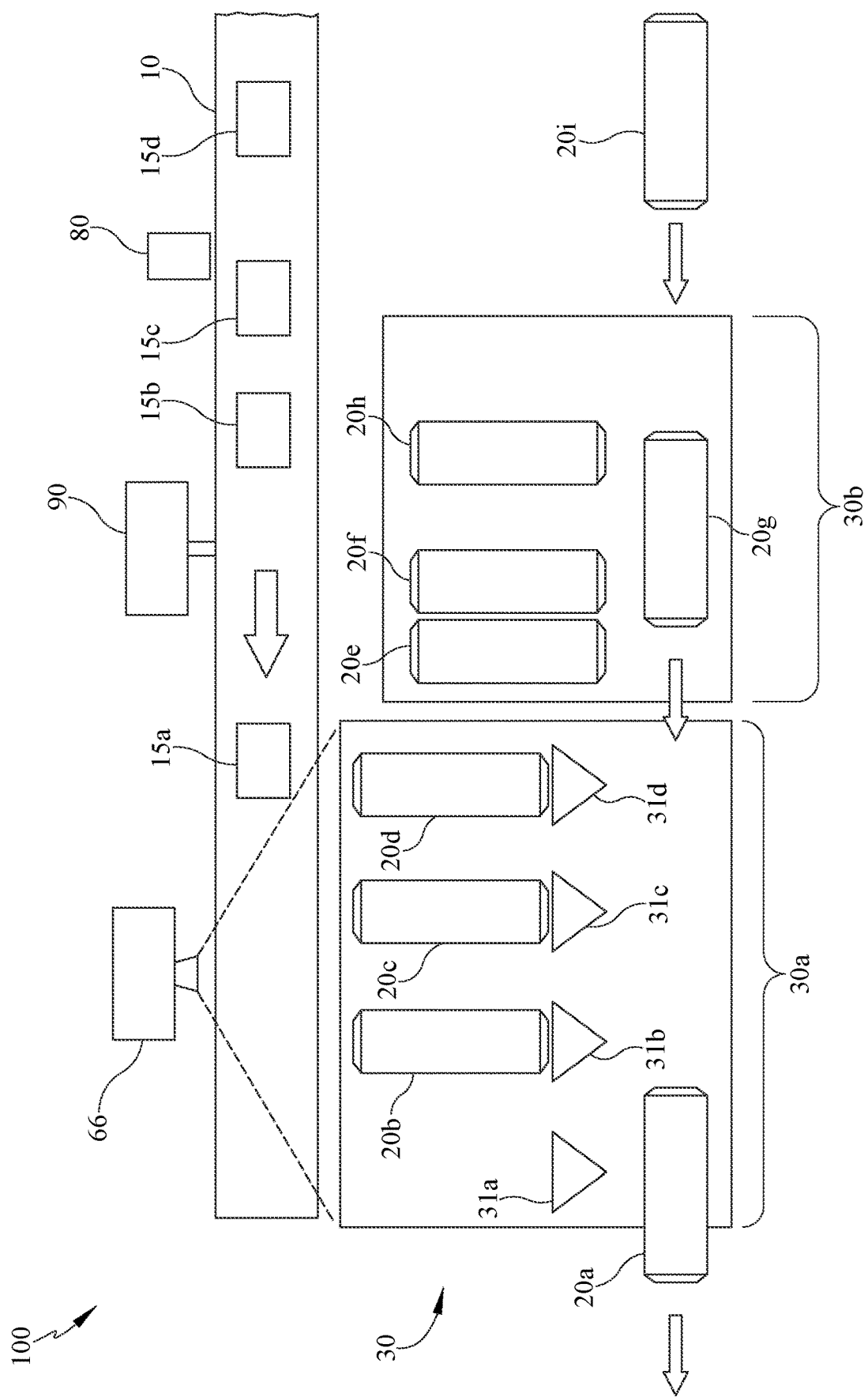
FIG. 1 is a schematic view of an exemplary parcel cart loading system made in accordance with the present invention.

FIG. 1 is a schematic view of an exemplary parcel cart loading system 100 made in accordance with the present invention.

Figure 2:
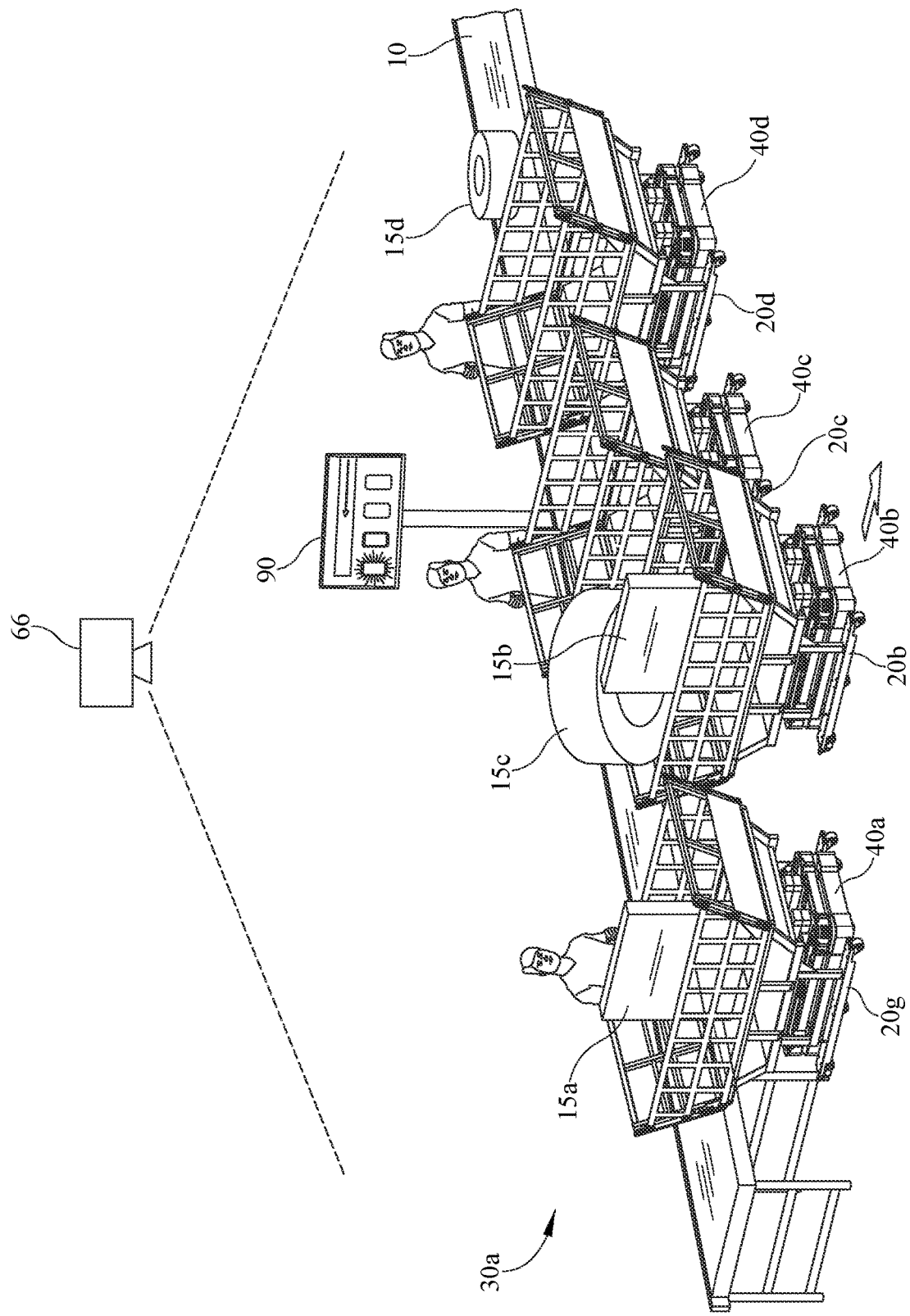
FIG. 2 is a perspective view of a loading area of the exemplary parcel cart loading system of FIG. 1.

FIG. 2 is a perspective view of a loading area 30a in the exemplary system 100 of FIG. 1.

Figure 4:
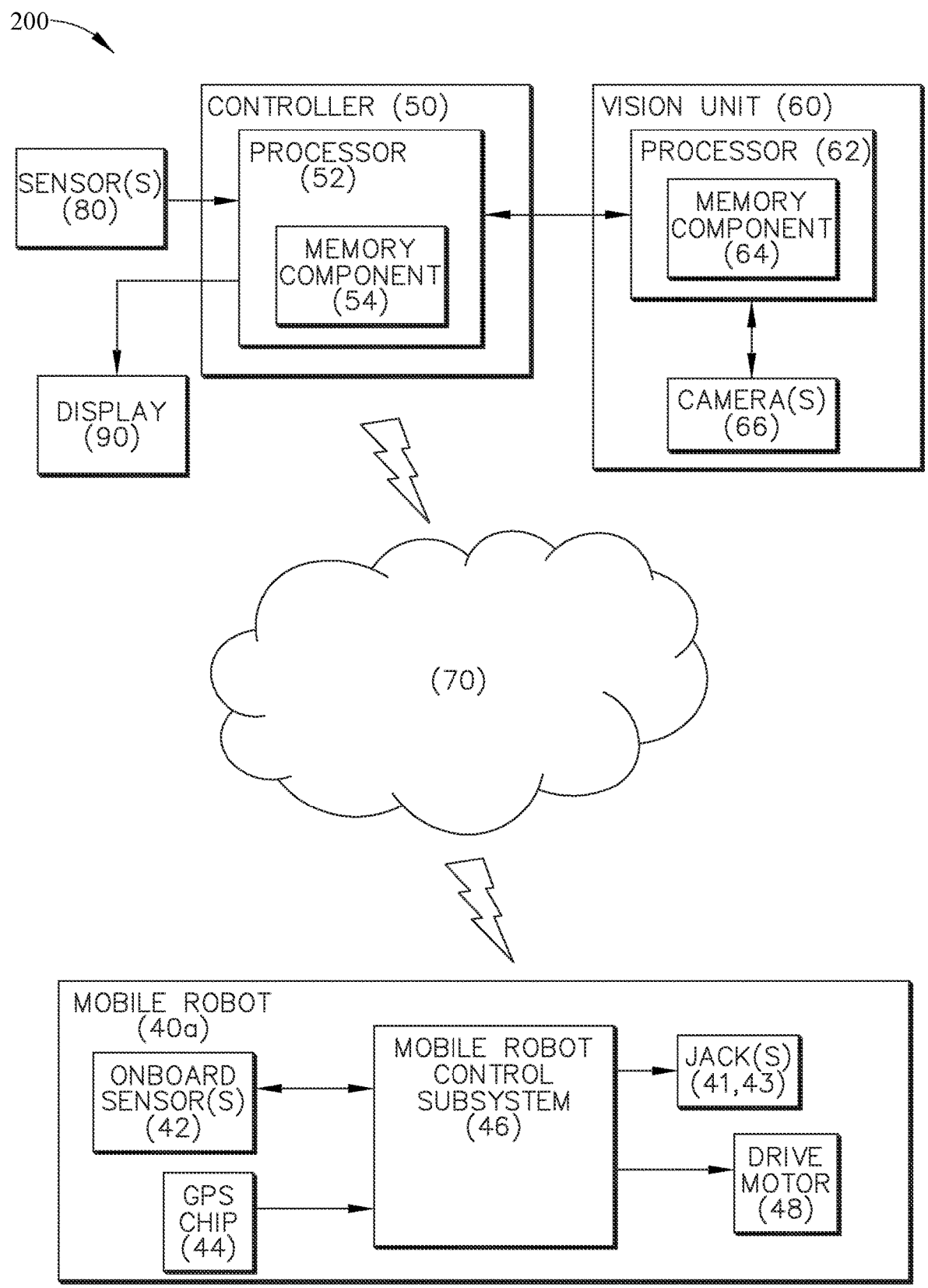
FIG. 4 is a schematic diagram of a vision and control subsystem for use in the exemplary parcel cart loading system of FIG. 1.

FIG. 4 is a schematic diagram of a vision and control subsystem for use in the exemplary system 100 of FIG. 1.

Referring now to FIGS. 1, 2, and 4, the exemplary system 100 includes a conveyor 10 for transporting parcels 15a, 15b, 15c, 15d within a sorting facility; a plurality of parcel carts 20a, 20c, 20d, 20e, 20f, 20g, 20h, 20i configured to receive parcels 15a, 15b, 15c, 15d offloaded from the conveyor 10; a loading station 30 where parcels 15a, 15b, 15c, 15d on the conveyor 10 are transferred to the parcel carts 20a, 20b, 20c, 20d, 20e, 20f, 20g, 20h, 20i; and a vision and control subsystem 200 that is operably connected to a plurality of mobile robots 40a, 40b, 40c, (one of which is shown in FIG. 4), such that the vision and control subsystem 200 can communicate instructions to, and receive data from, each of the mobile robots 40a, 40b, 40c, It is important to recognize that, in the discussion that follows and in the claims of the present application, "mobile robot" means any autonomous or self-guided vehicle whose movement is not dependent upon human operation, and which is capable of transporting parcel carts in the manner specified within the present disclosure.

It is also important to recognize that, in the discussion that follows and in the claims of the present application, the term "parcel" is not intended to be limiting and can include any article, item, or object that may be transported, loaded, and/or unloaded in the manner specified within the present disclosure.

Referring again to FIGS. 1, 2, and 4, the vision and control subsystem 200 includes a camera 66 for acquiring one or more images of a subset of parcel carts, and any parcels loaded therein, within the loading station 30 that are positioned to receive parcels 15a, 15b being offloaded from the conveyor 10 (e.g., parcel carts 20b, 20c, and 20d in FIG. 1). In this exemplary embodiment, the loading station 30 can be characterized as including two separate areas: a loading area 30a and a queue area 30b. The loading area 30a is the area within the loading station at which respective parcel carts 20a, 20b, 20c, 20d, 20e, 20f, 20g, 20h, 20i of the system 100 can be positioned to receive parcels 15a, 15b, 15c, 15d as they are offloaded from the conveyor and which is within the field of view of the camera 66 (as indicated in dashed lines in FIG. 1). The queue area 30b is the area within the loading station 30 which receives parcel carts intended for subsequent transfer to the loading area 30a (e.g., parcel carts 20e, 20f, 20g, 20h in FIG. 1). The image (or images) captured by the camera 66 are processed within the vision and control subsystem 200 to determine whether one or more parcel carts within the loading area 30a are loaded in a manner that satisfies one or more predetermined conditions corresponding to a parcel cart being fully loaded (or "full"). In response to determining that a parcel cart within the loading area 30a is fully loaded (such as parcel cart 20a in FIG. 1), the vision and control subsystem 200 communicates transport instructions to a mobile robot 40a, 40b, 40c, 40d (or a "first mobile robot") within the system 100 to transport the fully loaded parcel cart 20a to its predetermined destination within the sorting facility. In this regard, parcel carts within the loading area 30a are thus immediately and autonomously dispatched to their predetermined destination once identified by the vision and control subsystem 200 as being fully loaded. In this way, unlike some systems of prior art construction, the system 100 of the present disclosure thus eliminates any downtime associated with waiting for multiple parcel carts intended for the same destination to be fully loaded before transport. Furthermore, autonomous delivery of loaded parcel carts by the mobile robots 40a, 40b, 40c, 40d of the system 100 also eliminates the safety hazards associated with manually transporting loaded parcel carts.

Referring still to FIGS. 1, 2, and 4, subsequent to the vision and control subsystem 200 communicating instructions to transport a fully loaded parcel cart 20a out of the loading area 30a, the vision and control subsystem 200 communicates instructions to another mobile robot 40b, 40c, 40d (or a "second mobile robot") within the system 100 to transport a parcel cart positioned within the queue area 30b (e.g., parcel cart 20g in FIG. 1) to the location in the loading area 30a at which the fully loaded parcel cart 20a was previously positioned. In this regard, the loading area 30a may include multiple predetermined locations 31a, 31b, 31c, 31d at which parcel carts 20a, 20b, 20c, 20d, 20e, 20f, 20g, 20h, 20i within the system 100 can be positioned to receive parcels 15a, 15b, 15c, 15d offloaded from the conveyor 10.

Referring still to FIGS. 1, 2, and 4, in this particular implementation, as the fully loaded parcel cart 20a exits the first predetermined location 31a and the loading area 30a via a first mobile robot (not shown), the parcel cart 20g is transported to the first predetermined location 31a via a second robot 40a, as evidenced by viewing FIGS. 1 and 2 in sequence. Specifically, in FIG. 1, the parcel cart 20a is exiting the loading area 30a. In FIG. 2, the parcel cart 20g has replaced the parcel cart 20a in the loading area 30a. As perhaps best shown in FIG. 1, in this exemplary embodiment, the vision and control subsystem 200 is further configured to communicate instructions to yet another mobile robot (or a "third mobile robot") (not shown) within the system 100 to transport a parcel cart 20i positioned outside of the loading area 30a and queue area 30b into the queue area 30b to replace the parcel cart 20g transported to the loading area 30a, which replaced the fully loaded parcel cart 20a. By replenishing the loading area 30a and the queue area 30b of the loading station 30 with parcel carts in the above-described manner, the system 100 helps to ensure a parcel cart is always available to receive a parcel 15a, 15b, 15c, upon reaching the loading area 30a, thereby reducing downtime and improving the overall efficiency within the sorting facility.

Referring now to FIG. 4, the vision and control subsystem 200 generally includes: a vision unit 60 that includes the camera 66, which as noted above is configured to capture an image (or images) of parcel carts positioned within the loading area 30a of the loading station 30 as well as any parcels loaded within such parcel carts; and a controller 50 that is operably connected to the vision unit 60, such that the controller 50 can communicate instructions to, and receive data from, the vision unit 60.

Referring now again to FIGS. 1, 2, and 4, the camera 66 associated with the vision unit is configured to acquire two-dimensional and/or three-dimensional images of parcel carts within the loading area 30a. In this embodiment, the camera 66 preferably captures images of parcel carts within the loading area 30a substantially continuously to provide the vision and control subsystem 200 with image data that can be processed to assess whether any parcel cart within the loading area 30a is fully loaded at any given time. In alternative embodiments, the camera 66 may be configured to capture images on command (for example, in response to electronic signal or similar trigger). Preferably, the camera 66 is positioned to capture images which can be used to ascertain the extent to which the parcel carts within the loading area 30*a* are filled with parcels 15*a*, 15*b*, 15*c*, 15*d*, if at all. In this regard, the camera 66 is preferably mounted relative to the loading area 30*a* as to acquire overhead images of the parcel carts positioned within the loading area 30*a*, as best shown in FIGS. 1 and 2. In some embodiments, the camera 66 may comprise multiple cameras positioned to acquire different views of the parcel carts within the loading area 30*a*. Suitable cameras for use in the vision unit 60 include three-dimensional image sensors manufactured and distributed by ifm Effector Inc. of Malvern, Pennsylvania. Alternative embodiments are also contemplated in which other imaging means are used in place of or in conjunction with the camera 66, including, but not limited to, a two-dimensional laser scanner that makes use of a light curtain to profile the parcel carts within the loading area 30*a* and a three-dimensional time of flight sensor.

Referring now specifically to FIG. 4, in this exemplary embodiment, the image (or images) captured by the camera 66 are processed locally at the vision unit 60 in order to reduce the bandwidth demands imposed on the controller 50, which is responsible for the deployment and routing of the mobile robots 40*a*, 40*b*, 40*c*, 40*d* within a sorting facility (e.g., using fleet management software running on the controller 50). To this end, the vision unit 60 further includes a processor 62 configured to execute instructions (routines) stored in a memory component 64 or other computer-readable medium to process the image (or images) acquired by the camera 66 and perform the other various operations described herein for the processor 62 of the vision unit 60. In embodiments, in which the camera 66 comprises multiple cameras, the processor 62 of the vision unit 60 may similarly comprise multiple processors. For instance, in some embodiments, each respective camera of the vision unit 60 may have a processor associated therewith to process the image (or images) acquired by the camera 66. Suitable processors for use in the vision unit 60 include that provided within the Jetson Nano computer manufactured and distributed by Nvidia Corporation of Santa Clara, California, though other processors suitable of performing the operations described herein may alternatively be used.

Referring still to FIG. 4, the controller 50 includes a processor 52 configured to execute instructions stored in a memory component 54 or other computer-readable medium. In this exemplary embodiment, the controller 50 is a programmable logic controller or other industrial computer. The vision unit 60 and the controller 50 can be operably connected to facilitate the transmission of data from the vision unit 60 to the controller 50 and the communication of instructions from the controller 50 to the vision unit 60 by either a wired connection (e.g., Ethernet connection) or by a wireless connection (e.g., via network 70) using known interfaces and protocols.

Although it is generally preferred that the controller 50 and the vision unit 60 are each provided with their own processors 52, 62, one of skill in the art will appreciate that, in alternative embodiments, a single processor may be used to carry out the respective operations described for the processor 52 of the controller 50 and the processor 62 of the vision unit 60 described herein. In this regard, in some embodiments, the vision unit 60 may be a component of the controller 50 or be characterized as including only the camera 66.

Referring now again to FIGS. 1, 2, and 4, in this exemplary embodiment, the mobile robot 40*a* includes a drive motor 48 which is operably connected to at least one pair of wheels of the mobile robot 40*a* (e.g., via one or more axles) and which can be selectively activated to move the mobile robot 40*a*. The drive motor 48 may comprise one or more motors, and is operably connected to the controller 50, such that the drive motor 48 can be selectively activated and deactivated to rotate the wheels of the mobile robot 40*a* in response to instructions communicated from the controller 50. Specifically, in this exemplary implementation, the drive motor 48 is operably connected to the controller 50 via a mobile robot control subsystem 46, which is configured to initially receive instructions communicated from the controller 50, analyze the same, and communicate its own instructions which ultimately activate or deactivate the drive motor 48 and other components of the mobile robot 40*a*, as further described below. In this regard, the mobile robot control subsystem 46 may include an onboard processor, which is operably connected to the controller 50 via a network 70 using known interfaces and protocols. As further shown, mobile robot 40*a* includes one or more jacks 41, 43 which are operably connected to the mobile robot control subsystem 46, and which can be engaged (e.g., via instructions from the mobile robot control subsystem 46) to lift a parcel cart 20*a*, 20*b*, 20*c*, 20*d*, 20*e*, 20*f*, 20*g*, 20*h*, 20*i* above an underlying ground surface during transport of the parcel cart to an intended destination.

Referring now to FIG. 4, in this exemplary embodiment, mobile robot 40*a* also includes a GPS tracking chip 44 and one or more onboard sensors 42 operably connected to the controller via the mobile robot control subsystem 46, such that data gathered by the GPS tracking chip 44 and the one or more onboard sensors 42 are transmitted to the controller 50 for subsequent processing via the mobile robot control subsystem 46. In this exemplary embodiment, the one or more onboard sensors include two light detection and ranging (LIDAR) sensors (not shown), with each LIDAR sensor having a field of view and being configured to detect and measure the distance of objects within its field of view from mobile robot 40*a*. The LIDAR sensors aid the mobile robot 40*a* in collision detection and correctly positioning itself under a parcel cart 20*a*, 20*c*, 20*d*, 20*e*, 20*f*, 20*g*, 20*h*, 20*i* when docking therewith. The other mobile robots 40*b*, 40*c*, within the system 100 are identical to mobile robot 40*a*, and, in this regard, include the same components and function in the same manner as described for mobile robot 40*a*. Suitable mobile robots 40*a*, 40*b*, 40*c*, 40*d* for use with the system 100 include, but are not limited to, those described in commonly assigned U.S. Patent Application Publication No. 2020/0276998, which is incorporated herein by reference.

Referring now to FIGS. 1 and 2, in this exemplary embodiment, each parcel cart 20*a*, 20*b*, 20*c*, 20*d*, 20*e*, 20*f*, 20*g*, 20*h*, 20*i* within the system 100 includes a frame having a base and walls, which collectively define an internal cavity for receiving one or more parcels 15*a*, 15*b*, 15*d*. The frame is mounted on and supported by a substructure, which engages an underlying ground surface. As best shown in FIG. 2, in this exemplary embodiment, the substructure of each parcel cart 20*a*, 20*b*, 20*c*, 20*d*, 20*e*, 20*f*, 20*g*, 20*h*, 20*i* includes four legs that effectively define a cavity for receiving (three of which are visible in FIG. 2) the mobile robots 40*b*, 40*c*, 40*d*. Parcel carts suitable for use with the system 100 include, but are not limited to, those described in commonly assigned U.S. Patent Application Publication No. 2020/0276998, which, again, is incorporated herein by reference.

Referring now to FIGS. 2, and 4, to identify when a parcel cart positioned in the loading area 30*a* of the loading station 30 is fully loaded and ready to be transported to its predetermined destination, the camera 66 of the vision unit 60 captures an image of the parcel carts within the loading area 30a and any parcels loaded therein. The image is then processed by the processor 62 of the vision unit 60 to determine the extent to which, if any, the parcel carts within the image are loaded with parcels 15a, 15b, 15c, 15d. Specifically, in this implementation, the image is processed by the processor 62 of the vision unit 60 to determine a plurality of depth values for each respective parcel cart within the loading area 30a, where each depth value corresponds to the extent to which a particular area within the internal cavity of a parcel cart within the loading area 30a is vertically filled with parcels 15a, 15b, 15c, 15d. The average of the determined depth values for each respective parcel cart within the loading area 30a is then compared against a predetermined value determined to be indicative of a parcel cart 20a, 20b, 20c, 20d, 20e, 20f, 20h, 20i being fully loaded. Based on such comparison, the processor 62 of the vision unit then determines whether any of the parcel carts within the loading area 30a are fully loaded and therefore should be transported to their predetermined destination within the sorting facility. For example, in the loading area 30a environment shown in FIG. 2, based on an image of parcel carts 20b, 20c, 20d, and 20g, the vision unit 60 may determine that the average depth value corresponding to parcel cart 20b is sufficient as to be considered fully loaded and in need of transport, whereas the vision unit 60 may determine the average depth values determined for partially loaded parcel cart 20g and unloaded parcel carts 20c and 20d are not.

Referring still to FIGS. 2 and 4, once the processor 62 of the vision unit 60 has determined which, if any, of the parcel carts within the loading area have been fully loaded, the results of such determination are then transmitted as data to the processor 52 of the controller 50 for subsequent processing. The controller 50 processes the results of the determination made by the vision unit 60 to determine which, if any, of the parcel carts within the loading area 30a should be transported to their predetermined destination. Continuing with the previous example based on the loading area 30a environment in FIG. 2, in this instance, the controller 50 would determine that parcel cart 20b is ready for transport based on the results received from the vision unit 60. After determining that the parcel cart 20b is ready for transport, the processor 52 of the controller 50 determines a route for the parcel cart 20b to travel through the sorting facility to its predetermined destination. To transport the parcel cart 20b to the predetermined destination, the processor 52 of the controller 50 then communicates transport instructions to a mobile robot 40b.

Referring now to FIGS. 1 and 4, in this implementation, each predetermined location 31a, 31b, 31c, 31d within the loading area 30a of the loading station 30 corresponds to a predetermined destination (as indicated by "PD1" and "PD2" in FIG. 3) within the sorting facility. In this regard, the vision and control subsystem 200 is able to discern what area of the sorting facility a parcel cart should be delivered based on which predetermined location 31a, 31b, 31c, 31d at which the parcel cart is positioned within the loading area 30a. To account for the time between which a parcel cart (e.g., parcel cart 20a of FIG. 1) is being transported out of a predetermined location 31a, 31b, 31c, 31d within the loading area 30a and another parcel cart (e.g., parcel cart 20g in FIG. 1) is being transported to the predetermined location 31a, 31b, 31c, 31d at which the outbound parcel cart was previously located and prevent potential downtime caused thereby, more than one of the predetermined locations 31a, 31b, 31c, 31d within the loading area 30a may correspond to the same destination, as shown in FIG. 3.

Figure 3:
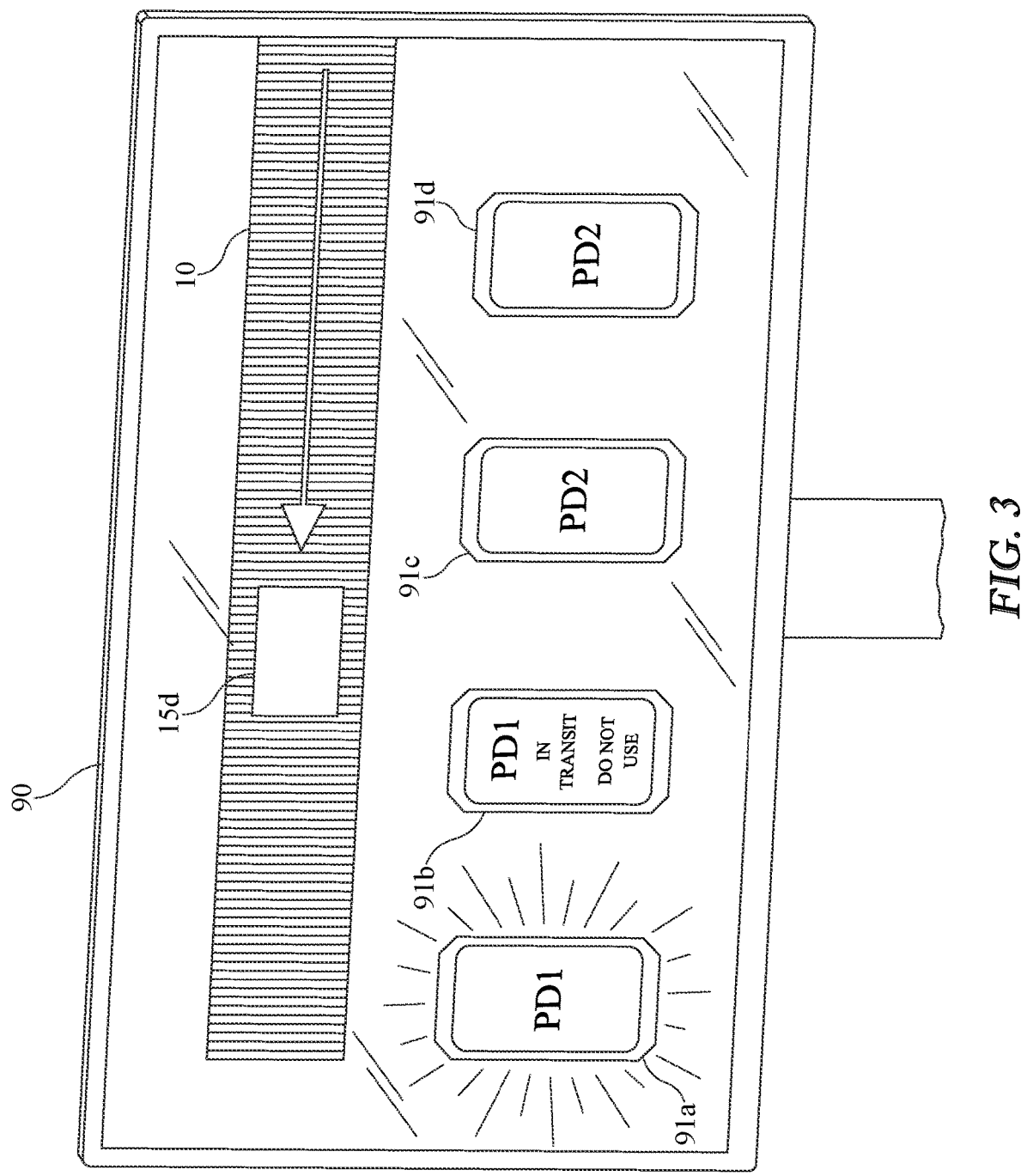
FIG. 3 is a perspective view of a display of the exemplary parcel cart loading system of FIG. 1 in isolation.

FIG. 3 is a perspective view of a display 90 of the exemplary system 100 of FIG. 1 in isolation.

Referring now to FIGS. 1-4, to help ensure that each parcel 15a, 15b, 15c, 15d is loaded into a parcel cart that is intended to be transported to the predetermined destination corresponding to the parcel 15a, 15b, 15c, 15d, in this exemplary embodiment, the vision and control subsystem 200 further includes a sensor 80 and a display 90, which are both operably connected to the controller 50 via wired or wireless connection. The sensor 80 is operably connected to the controller 50, such that information acquired by the sensor 80 can be transmitted to the controller 50 for subsequent processing. The display 90 is operably connected to the controller 50, such that the display 90 receives and displays information from the controller 50.

Referring now to FIGS. 1 and 4, the sensor 80 is configured to read indicia (e.g., barcodes, QR codes, etc.) provided on the parcels 15a, 15b, 15c, 15d and to acquire identifying information from such indicia that can be used to ascertain where in the sorting facility a particular parcel 15a, 15b, 15c, 15d should be directed. To this end, the sensor 80 is preferably positioned upstream of the loading area 30a and adjacent to the conveyor 10, as shown in FIG. 1. In this exemplary embodiment, the sensor 80 is an optical scanner, though other suitable devices for reading and acquiring the information associated with the indicia provided on the parcels 15a, 15c, 15d may alternatively be used. In some embodiments, the sensor 80 may comprise multiple sensors positioned at different locations along the conveyor 10.

Referring now again to FIGS. 1-4, the identifying information received from the sensor is processed by the processor 52 of the controller 50 to determine what area within the sorting facility the parcel 15a, 15b, 15c, 15d corresponding to the identifying information should be delivered, and thus which parcel cart (or parcel carts) within the loading area 30a are suitable candidates for receiving the parcel 15a, 15b, 15c, 15d. The processor 52 of the controller 50 then communicates information to the display 90 that reflects which parcel cart (or parcel carts) in the loading area 30a the parcel corresponding to the identifying information can be properly deposited. In other words, the display 90 is used to provide a visual indication as to which parcel cart (or parcel carts) the last "scanned" parcel can be deposited. The display 90 is preferably elevated or mounted overhead at a position which enables operators in the loading area 30a to clearly see this visual indication. In some embodiments, the display 90 may include multiple displays positioned at different locations about the loading area 30a.

Referring now to FIGS. 2 and 3, in this implementation, the information transmitted by the controller 50 causes the display 90 to display, amongst other things, indicia 91a, 91b, 91c, 91d corresponding to the predetermined locations 31a, 31b, 31c, 31d within the loading area 30a, and thus the respective parcel carts positioned thereat. The information also includes a signifier which effectively identifies which parcel cart within the loading area 30a a recently scanned parcel should be delivered. In the implementation shown in FIGS. 2 and 3, the parcel 15d is the last parcel to have been read by the sensor 80 and the identifying information associated with the parcel 15d indicated that the parcel 15d should be delivered to a first predetermined destination (PD1) within the sorting facility. As such, either parcel cart 20g, 20b positioned at the first predetermined location 31a or the second predetermined location 31b and corresponding to indicia 91a and 91b, respectively, are potential candidates for receiving the parcel 15d. However, in this implementation, the parcel cart 20b in the second predetermined location 31*b* corresponding to indicia 91*b* is in transit as a result of the vision unit 60 determining the parcel cart 20*b* is fully loaded. To reflect the same to operators charged with offloading the parcels from the conveyor 10, in this implementation, the information transmitted by the controller 50 to the display 90 causes the display of a message indicating that the parcel cart 20*b* positioned at the second predetermined location 31*b* should not be used. In this implementation, the signifier within the information transmitted from the controller 50 corresponds to the blinking of indicia 91*a*, indicating that the parcel cart 20*g* positioned at the first predetermined location 31*a* in the loading area 30*a* is the parcel cart in which parcel 15*d* should be deposited. It is appreciated, however, that the above-described implementation corresponding to the loading area 30*a* environment in FIG. 2 is merely exemplary and that the information transmitted by the controller may include a number of informative prompts or messages for the benefit of operators at the loading area 30*a*.

Referring now again to FIGS. 1, 2, and 4, subsequent to communicating instructions to a mobile robot 40*a*, 40*b*, 40*c*, 40*d* (i.e., a "first mobile robot") to transport a fully loaded parcel cart (e.g., parcel cart 20*a* in FIG. 1) out of the loading area 30*a*, the processor 52 of the controller communicates transport instructions to another mobile robot 40*a*, 40*b*, 40*c*, 40*d* (i.e., a "second mobile robot") within the system 100 to transport a parcel cart (e.g., parcel cart 20*g* in FIG. 1) from the queue area 30*b* to the predetermined location at which the full parcel cart in transit to its predetermined destination was previously located (e.g., predetermined location 31*a* in FIG. 1). In this implementation, the processor 52 of the controller 50 then communicates transport instructions to yet another mobile robot 40*a*, 40*b*, 40*c*, 40*d* (i.e., a "third mobile robot") within the system 100 to transport a parcel cart positioned outside of the loading area 30*a* and queue area 30*b* (e.g., parcel cart 20*i* in FIG. 1) to replace the parcel cart transported to the loading area 30*a* (e.g., parcel cart 20*g* in FIG. 1).

As an example of improved efficiency, during an initial assessment of throughput data generated by the above-described system 100 during a predetermined time interval in comparison to the throughput data generated by a traditional manual transport system in which loaded parcel carts were transferred by virtue of being hauled by an operator-driven vehicle during the same time interval, it was found that the system 100 of the present invention was able to transport a total of 887 parcels while the manual system was able to transport a total of 1060 parcels. Based on the foregoing data, the autonomous mobile robot transport rate-to-manual transport rate ratio, which is indicative of how many operator-driven vehicles can be placed by a single mobile robot, was determined to be approximately 0.83.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A parcel cart loading system, comprising:
a conveyor for transporting parcels;
a plurality of parcel carts configured to receive parcels offloaded from the conveyor;
a loading station at which parcel carts of the plurality of parcel carts are positioned at predetermined locations to receive parcels offloaded from the conveyor; and
a vision and control subsystem operably connected to a plurality of mobile robots, the vision and control subsystem including
a camera for acquiring images of the parcel carts of the plurality of parcel carts positioned at the loading station, and
one or more processors configured to execute instructions stored in a memory component,
wherein at least one processor of the one or more processors is operably connected to the camera and is configured to execute instructions to process images received from the camera to determine if any parcel carts of the plurality of parcel carts positioned at the loading station has been loaded with one or more parcels in a manner that satisfies one or more predetermined conditions corresponding to a particular parcel cart being fully loaded, and
wherein at least one processor of the one or more processors is configured to execute instructions to (i) communicate instructions to a first mobile robot of the plurality of mobile robots to transport a parcel cart determined to be fully loaded from its predetermined location at the loading station to a predetermined destination and (ii) communicate instructions to a second mobile robot of the plurality of mobile robots to transport another parcel cart of the plurality of parcel carts to the predetermined location at which the parcel cart transported by the first mobile robot was previously positioned at the loading station.

2. The system of claim 1, and further comprising:
a display operably connected to the vision and control subsystem and configured to display indicia indicating which parcel cart of the plurality of parcel carts positioned at the loading station a parcel on the conveyor should be deposited.

3. The system of claim 1, and further comprising:
a sensor operably connected to the vision and control subsystem and configured to acquire identifying information of the parcels on the conveyor.

4. The system of claim 2, and further comprising:
a sensor operably connected to the vision and control subsystem and configured to acquire identifying information of the parcels on the conveyor;
wherein the display is updated based on the identifying information acquired by the sensor.

5. The system of claim 1, wherein the vision and control subsystem includes:
a vision unit including the camera and a first processor of the one or more processors operably connected to the camera; and
a controller including a second processor of the one or more processors, wherein the controller is operably connected to the vision unit and the plurality of mobile robots.

6. A parcel cart loading system, comprising:
a conveyor for transporting parcels;
a plurality of parcel carts configured to receive parcels offloaded from the conveyor;
a loading station, including
a loading area including multiple predetermined locations at which respective parcel carts of the plurality of parcel carts can be positioned to receive parcels offloaded from the conveyor, and a queue area configured to receive parcel carts of the plurality of parcel carts intended for subsequent transfer to the loading area of the loading station; and a vision and control subsystem operably connected to a plurality of mobile robots, the vision and control subsystem including a camera for acquiring images of parcel carts of the plurality of parcel carts located in the loading area of the loading station, and one or more processors configured to execute instructions stored in a memory component, wherein at least one processor of the one or more processors is operably connected to the camera and is configured to execute instructions to process images received from the camera to determine if any parcel carts of the plurality of parcel carts positioned within the loading area of the loading station has been loaded with one or more parcels in a manner that satisfies one or more predetermined conditions corresponding to a particular parcel cart being fully loaded, and wherein at least one processor of the one or more processors is configured to execute instruction to (i) communicate instructions to a first mobile robot of the plurality of mobile robots to transport a parcel cart within the loading area of the loading station determined to be fully loaded from a particular one of the multiple predetermined locations to a predetermined destination, and (ii) communicate instructions to a second mobile robot of the plurality of mobile robots to transport a parcel cart of the plurality of parcel carts positioned within the queue area of the loading station to the particular one of the multiple predetermined locations within the loading area at which the parcel cart transported by the first mobile robot was previously positioned.

7. The system of claim 6, and further comprising:
a display operably connected to the vision and control subsystem and configured to display indicia indicating which parcel cart of the plurality of parcel carts positioned within the loading area of the loading station a parcel on the conveyor should be deposited.

8. The system of claim 6, and further comprising:
a sensor operably connected to the vision and control subsystem and configured to acquire identifying information of the parcels on the conveyor.

9. The system of claim 7, and further comprising:
a sensor operably connected to the vision and control subsystem and configured to acquire identifying information of the parcels on the conveyor;
wherein the display is updated based on the identifying information acquired by the sensor.

10. The system of claim 6, wherein the vision and control subsystem includes:
a vision unit including the camera and a first processor of the one or more processors operably connected to the camera; and
a controller including a second processor of the one or more processors, wherein the controller is operably connected to the vision unit and the plurality of mobile robots;
wherein the second processor communicates instructions to the first mobile robot and the second mobile robot.

11. A parcel cart loading system, comprising:
a conveyor for transporting parcels;
a plurality of parcel carts configured to receive parcels offloaded from the conveyor;
a loading station, including
a loading area including multiple predetermined locations at which respective parcel carts of the plurality of parcel carts can be positioned to receive parcels offloaded from the conveyor, and
a queue area configured to receive parcel carts of the plurality of parcel carts intended for subsequent transfer to the loading area of the loading station; and
a vision and control subsystem operably connected to a plurality of mobile robots, the vision and control subsystem including
a vision unit, including (a) a camera for acquiring images of parcel carts of the plurality of parcel carts located in the loading area of the loading station, and (b) a first processor operably connected to the camera and configured to execute instructions stored in a first memory component to receive and process the images received from the camera to determine if a parcel cart of the plurality of parcel carts located within the loading station has been loaded with one or more parcels in a manner that satisfies one or more predetermined conditions corresponding to the parcel cart being fully loaded, and
a controller operably connected to the vision unit, the controller including a second processor configured to execute instructions stored in a second memory component to (i) communicate instructions to a first mobile robot of the plurality of mobile robots to transport the parcel cart within the loading area of the loading station from a particular one of the multiple predetermined locations to a predetermined destination if the parcel cart is determined to be fully loaded and (ii) communicate instructions to a second mobile robot of the plurality of mobile robots to transport a parcel cart of the plurality of parcel carts positioned within the queue area of the loading station to the particular one of the multiple predetermined locations within the loading area at which the parcel cart transported by the first mobile robot was previously positioned.

12. The system of claim 11, and further comprising:
a display operably connected to the controller and configured to display indicia indicating which parcel cart of the plurality of parcel carts positioned within the loading area of the loading station a parcel on the conveyor should be deposited.

13. The system of claim 11, and further comprising:
a sensor operably connected to the controller and configured to acquire identifying information of the parcels on the conveyor.

14. The system of claim 12, and further comprising:
a sensor operably connected to the controller and configured to acquire identifying information of the parcels on the conveyor;
wherein the display is updated based on the identifying information acquired by the sensor.

* * * * *